US011928806B2

United States Patent
Wang et al.

(10) Patent No.: US 11,928,806 B2
(45) Date of Patent: Mar. 12, 2024

(54) SYSTEMS AND METHODS FOR EVALUATING PART DENSITY, CONTAMINATION AND DEFECTS USING COMPUTED TOMOGRAPHY SCANNING

(71) Applicant: Cummins Inc., Columbus, IN (US)

(72) Inventors: Yujun Wang, Columbus, IN (US); Ben Wang, Columbus, IN (US); Carl Justin Kamp, Winthrop, MA (US); Leigh Anne Rogoski, Columbus, IN (US); Rafael Ernesto Vasquez Lombardo, Columbus, IN (US); Michael J. Cunningham, Columbus, IN (US); Krishna Pradeep Chilumukuru, Columbus, IN (US); Neal W. Currier, Columbus, IN (US)

(73) Assignee: Cummins Inc., Columbus, IN (US)

( * ) Notice: Subject to any disclaimer, the term of this patent is extended or adjusted under 35 U.S.C. 154(b) by 438 days.

(21) Appl. No.: 17/174,884

(22) Filed: Feb. 12, 2021

(65) Prior Publication Data

US 2021/0256684 A1    Aug. 19, 2021

Related U.S. Application Data

(60) Provisional application No. 62/976,718, filed on Feb. 14, 2020.

(51) Int. Cl.
*G06K 9/00* (2022.01)
*G05B 15/02* (2006.01)
(Continued)

(52) U.S. Cl.
CPC ............ *G06T 7/0004* (2013.01); *G05B 15/02* (2013.01); *G06T 3/40* (2013.01); *G06T 7/11* (2017.01);
(Continued)

(58) Field of Classification Search
CPC ....... G06T 7/11; G06T 7/0004; G06T 7/0008; G06T 7/001; G06T 7/0014;
(Continued)

(56) References Cited

U.S. PATENT DOCUMENTS 4,982,086 A    1/1991 Withjack
8,953,738 B2   2/2015 Tsuchimoto et al.
(Continued)

FOREIGN PATENT DOCUMENTS

WO    WO-2005/095932    10/2005

OTHER PUBLICATIONS

Zhang, G., Chen, Z., Zhang, L., & Cheng, J. (Oct. 2006). Exact reconstruction for dual energy computed tomography using an HL curve method. In 2006 IEEE Nuclear Science Symposium Conference Record (vol. 6, pp. 3485-3488). IEEE. (Year: 2006).*
(Continued)

*Primary Examiner* — Emily C Terrell
*Assistant Examiner* — Kevin M Coomber
(74) *Attorney, Agent, or Firm* — FOLEY & LARDNER LLP

(57) ABSTRACT

A computer system is structured to determine a density of particulate matter in a diesel particulate filter (DPF) sample. The computer system includes a processing circuit having a processor and a memory. The processing circuit is structured to generate a computed tomography (CT) scan-based image of the DPF sample; and, segment the CT scan-based image of the DPF sample into a plurality of regions. For at least one region from the plurality of regions, the processing circuit is structured to determine a density of a portion of the DPF sample corresponding to the at least one region of the CT scan-based image of the DPF sample and cause an electronic display of a user device to display the CT scan-based image
(Continued)

including the at least one region and an indication of the density for the at least one region.

16 Claims, 8 Drawing Sheets

(51) Int. Cl.
*G06T 3/40* (2006.01)
*G06T 7/00* (2017.01)
*G06T 7/11* (2017.01)

(52) U.S. Cl.
CPC .............. *G06T 2207/10081* (2013.01); *G06T 2207/20132* (2013.01)

(58) Field of Classification Search
CPC . G06T 2207/10081; G06T 2207/10072; G06T 2207/30164; G06T 3/40; G06T 2207/20132; H04W 24/00; G01N 33/0006; G01N 21/31; F01N 9/002; F01N 2550/04; F01N 2550/12; F01N 2560/05; F01N 11/00; F01N 3/021; G01M 15/102; G05B 15/02

See application file for complete search history.

(56) References Cited

U.S. PATENT DOCUMENTS

| 9,869,645 B2 | 1/2018 | Stuke et al. |
| 2011/0182495 A1* | 7/2011 | Sun ........................... G06T 7/48 382/141 |
| 2016/0282285 A1* | 9/2016 | Karlen ................. G01N 23/083 |
| 2017/0154235 A1* | 6/2017 | Morard ................. G06T 7/0004 |
| 2018/0361299 A1 | 12/2018 | Ingram-Ogunwumi et al. |

OTHER PUBLICATIONS

Usui et al. "Ash Accumulation and Transport in Diesel Particulate Filters (First Report)", National Institute of Advanced Industrial Science and Technology, Powerpoint presented at the 2018 JSAE Annual Congress (Spring), May 2018, 19 pages.

Usui et al. "Ash Accumulation and Transport in Diesel Particulate Filters (First Report)", Nov. 2018, 6 pages.

* cited by examiner

SYSTEMS AND METHODS FOR EVALUATING PART DENSITY, CONTAMINATION AND DEFECTS USING COMPUTED TOMOGRAPHY SCANNING

CROSS-REFERENCE TO RELATED PATENT APPLICATION

This application claims the benefit of and priority to U.S. Provisional Application No. 62/976,718, filed Feb. 14, 2020, which is incorporated herein by reference in its entirety.

TECHNICAL FIELD

The present disclosure relates to systems and methods for evaluating part density, contamination and defects using computed tomography (CT) scanning. More particularly, the present disclosure relates to systems and methods for evaluating particulate matter density, contamination and defects in components of exhaust aftertreatment systems, such as filters.

BACKGROUND

An engine (e.g., in a vehicle) may be fluidly coupled to an exhaust aftertreatment system structured to treat exhaust gases from the engine. The aftertreatment system may include a variety of components, such as a reductant dosing system, a catalyst, various flow conduits, a filtration system, etc. For example, an exhaust aftertreatment system for a diesel engine may include a diesel oxidation catalyst (DOC) structured to reduce or remove carbon monoxide from the exhaust stream, a diesel particulate filter (DPF) structured to reduce or remove particulate matter from the exhaust stream, and a selective catalytic reduction (SCR) component structured to reduce NOx levels in the exhaust stream. Over time, a DPF may become contaminated (e.g., clogged with particulate matter). When this occurs, a DPF may become less effective in reducing or removing particulate matter from the exhaust stream.

SUMMARY

One example embodiment relates to a method for determining a density of particulate matter in a particulate filter sample. The method includes: generating, by a controller of the computing system, a computed tomography (CT) scan-based image of the particulate filter sample; segmenting, by the controller, the CT scan-based image of the particulate filter sample into a plurality of regions; and for at least one region from the plurality of regions, determining, by the controller, a density of a portion of the particulate filter sample corresponding to the at least one region of the CT scan-based image of the particulate filter sample; and causing, by the controller, an electronic display of a user device to display the CT scan-based image comprising the at least one region and an indication of the density for the at least one region. In one embodiment and as described herein, the particulate filter sample is a diesel particulate filter (DPF) sample where the diesel particulate filter is included in an engine-exhaust aftertreatment system.

In some embodiments, the method includes determining a grayscale value for the at least one region; correlating the grayscale value to a reference value; and, determining the density based on the reference value.

In some embodiments, the method includes positioning a reference stack comprising a plurality of reference samples proximate to the DPF sample prior to generating the CT scan-based image. The CT scan-based image corresponds to a plurality of reference values, and each reference value corresponds to a particular reference sample. The method may further include determining the reference value by selecting from the plurality of reference values the reference value corresponding to the grayscale value.

In some embodiments, the CT scan based image of the DPF sample is a first CT scan based image generated at a first energy level. The method may then further include: generating a second CT scan based image of the DPF sample at a second energy level different from the first energy level, the at least one region is common to the first CT scan based image and the second CT scan based image; determining a mean atomic number for the at least one region; and, determining the density of the portion of the DPF sample. In some embodiments, determining a mean atomic number for the at least one region further comprises determining a first attenuation coefficient for the first energy level; determining a second attenuation coefficient for the second energy level; determining an attenuation coefficient delta between the first attenuation coefficient and the second attenuation coefficient; and, determining the mean atomic number based on the attenuation coefficient delta. In some embodiments, the method includes determining at least one of a contamination level and a contaminant within the portion of the DPF sample by correlating the mean atomic number to a known contaminant.

In some embodiments, the method includes segmenting the CT scan-based image of the DPF sample into a plurality of regions. In some embodiments, the method includes programmatically identifying the at least one region from the plurality of regions as a region of interest.

In some embodiments, the DPF sample is structured to maximize a resolution of the CT scan-based image. In some embodiments, the DPF sample is a quadrant of a substantially circular segment of the diesel particulate filter, and the method further includes determining at least one portion of the quadrant that is not essential to improve the resolution; and trimming the at least one portion to reduce the size of the DPF sample.

Another example embodiment relates to a computer system structured to determine a density of particulate matter in a diesel particulate filter (DPF) sample. The computer system includes a processing circuit having a processor and a memory. The processing circuit is structured to generate a computed tomography (CT) scan-based image of the DPF sample; and, segment the CT scan-based image of the DPF sample into a plurality of regions. For at least one region from the plurality of regions, the processing circuit is structured to determine a density of a portion of the DPF sample corresponding to the at least one region of the CT scan-based image of the DPF sample and cause an electronic display of a user device to display the CT scan-based image including the at least one region and an indication of the density for the at least one region.

In some embodiments, the processing circuit is structured to determine a grayscale value for the at least one region, correlate the grayscale value to a reference value, and determine the density based on the reference value.

In some embodiments, the processing circuit is structured to position a reference stack comprising a plurality of reference samples proximate to the DPF sample prior to generating the CT scan-based image. The CT scan-based image corresponds to a plurality of reference values, and each reference value corresponds to a particular reference sample. The processing circuit may then determine the reference value by selecting from the plurality of reference values the reference value corresponding to the grayscale value.

In some embodiments, the CT scan based image of the DPF sample is a first CT scan based image generated at a first energy level. The processing circuit is structured to generate a second CT scan based image of the DPF sample at a second energy level different from the first energy level, where the at least one region is common to the first CT scan based image and the second CT scan based image; determine a mean atomic number for the at least one region; and determine the density of the portion of the DPF sample. In some embodiments, determining a mean atomic number for the at least one region further comprises determining a first attenuation coefficient for the first energy level; determining a second attenuation coefficient for the second energy level; determining an attenuation coefficient delta between the first attenuation coefficient and the second attenuation coefficient; and determining the mean atomic number based on the attenuation coefficient delta. In some embodiments, the processing circuit is structured to determine at least one of a contamination level and a contaminant within the portion of the DPF sample by correlating the mean atomic number to a known contaminant.

In some embodiments, the processing circuit is structured to segment the CT scan-based image of the DPF sample into a plurality of regions. In some embodiments, the processing circuit is structured to identify the at least one region from the plurality of regions as a region of interest.

In some embodiments, the DPF sample is structured to maximize a resolution of the CT scan-based image. In some embodiments, the DPF sample is a quadrant of a substantially circular segment of the diesel particulate filter. The processing circuit is structured to determine at least one portion of the quadrant that is not essential to improve the resolution and operations to trim the at least one portion to reduce the size of the DPF sample.

Still another example embodiment relates to a non-transitory computer-readable media having computer-executable instructions stored thereon that, when executed by a processor of a computer system, cause operations to determine a density of particulate matter in a particulate filter (DPF) sample; generate a computed tomography (CT) scan-based image of the DPF sample; segment the CT scan-based image of the DPF sample into a plurality of regions; and, for at least one region from the plurality of regions, determine a density of a portion of the DPF sample corresponding to the at least one region of the CT scan-based image of the DPF sample, and cause an electronic display of a user device to display the CT scan-based image comprising the at least one region and an indication of the density for the at least one region.

In some embodiments, the operations include determining a grayscale value for the at least one region, correlating the grayscale value to a reference value, and determining the density based on the reference value.

In some embodiments, the operations include positioning a reference stack comprising a plurality of reference samples proximate to the DPF sample prior to generating the CT scan-based image, wherein the CT scan-based image corresponds to a plurality of reference values, each reference value corresponding to a particular reference sample; and, determining the reference value by selecting from the plurality of reference values the reference value corresponding to the grayscale value.

In some embodiments, the CT scan based image of the DPF sample is a first CT scan based image generated at a first energy level. The operations include generating a second CT scan based image of the DPF sample at a second energy level different from the first energy level, where the at least one region is common to the first CT scan based and the second CT scan based image; determining a mean atomic number for the at least one region; and determining the density of the portion of the DPF sample. In some embodiments, determining a mean atomic number for the at least one region further comprises determining a first attenuation coefficient for the first energy level; determining a second attenuation coefficient for the second energy level; determining an attenuation coefficient delta between the first attenuation coefficient and the second attenuation coefficient; and determining the mean atomic number based on the attenuation coefficient delta. In some embodiments, the operations include determining at least one of a contamination level and a contaminant within the portion of the DPF sample by correlating the mean atomic number to a known contaminant.

In some embodiments, the operations include segmenting the CT scan-based image of the DPF sample into a plurality of regions, and identifying the at least one region from the plurality of regions as a region of interest.

In some embodiments, the DPF sample is structured to maximize a resolution of the CT scan-based image. In some embodiments, the DPF sample is a quadrant of a substantially circular segment of the diesel particulate filter. The operations may further include determining at least one portion of the quadrant that is not essential to improve the resolution and trimming the at least one portion to reduce the size of the DPF sample.

These and other features, together with the organization and manner of operation thereof, will become apparent from the following detailed description when taken in conjunction with the accompanying drawings.

DETAILED DESCRIPTION

Following below are more detailed descriptions of various concepts related to, and implementations of methods, apparatuses, and systems for evaluating part density, contamination and defects using CT scanning. The various concepts introduced herein may be implemented in any number of ways, as the concepts described are not limited to any particular manner of implementation. Examples of specific implementations and applications are provided primarily for illustrative purposes.

Referring to the Figures generally, the various embodiments disclosed herein relate to systems, apparatuses, and methods for evaluating part density, contamination and defects using CT scanning. The systems and methods for evaluating part density, contamination and defects using CT scanning, described further herein, may be used to assess the composition and/or health of any suitable parts included in the vehicle or a similar system. For example, as described further herein, the vehicle or an off-road system may include an engine and an exhaust aftertreatment system, which, in turn, may include filtration media, such as a DPF. In operation, the systems and methods for evaluating part density, contamination and defects using CT scanning may be used to assess the composition and/or health of the filtration media.

Figure 1:
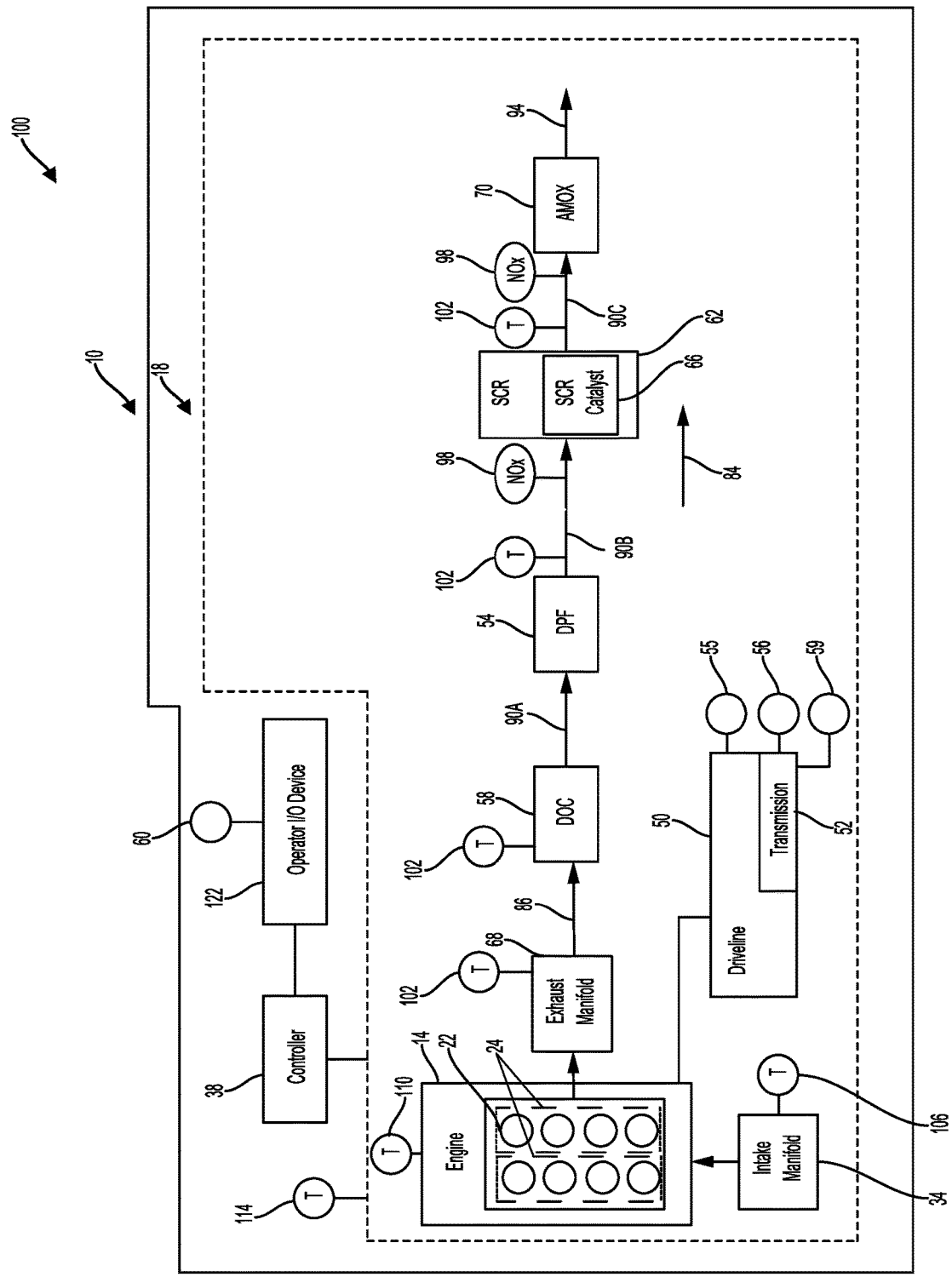
FIG. 1 is a schematic diagram of a vehicle having a controller coupled to an engine coupled to an exhaust aftertreatment system and various additional parts, according to an example embodiment.

Referring now to FIG. 1, a vehicle having a controller coupled to an engine coupled to an example exhaust aftertreatment system and various additional parts is depicted, according to an example embodiment. The vehicle 100 may be an on-road or an off-road vehicle including, but not limited to, line-haul trucks, mid-range trucks (e.g., pick-up trucks), tanks, airplanes, locomotives, various types of industrial equipment (excavators, backhoes, tractors, mowers, etc.), etc. Examples of off-road vehicles or other implementations include power generators, pumps, mining and/or mineral extraction equipment, etc. The vehicle 100 generally includes an engine system 10 that includes an internal combustion engine 14, an exhaust aftertreatment system 18 in exhaust gas-receiving communication with the engine 14, a driveline 50 including a transmission 52, an operator input/output (I/O) device 122, and a controller 38 coupled to various components. Each of these components are described in more detail below.

According to one embodiment and as shown, the engine 14 is structured as a compression-ignition internal combustion engine that utilizes diesel fuel. The size/displacement of the engine 14 may vary based on the application (e.g., 30 L to 120 L). Further, the structure of the engine 14 may also vary (e.g., V6-style engine, V8, inline, etc.). In various alternate embodiments, the engine 14 may be structured as various other types of engine. Other examples of the engine 14 include, but are not limited to, other internal combustion engines (e.g., gasoline, natural gas), hybrid engines (e.g., a combination of an internal combustion engine and an electric motor), etc. In the example shown, the engine 14 includes a plurality of cylinders 22. The plurality of cylinders 22 may be arranged into one or more cylinder banks 24.

The vehicle 100 is also shown to include a driveline 50, which includes a transmission 52. The driveline 50 may comprise various additional components including, for example, a driveshaft, axles, wheels, etc. Transmission 52 receives power from the engine 14 and provides rotational power to a final drive (e.g., wheels) of the vehicle 100. In some embodiments, the transmission 52 is a continuously variable transmission (CVT). In other embodiments, the transmission 52 is a geared transmission comprising a plurality of gears. The transmission 52 may be an automatic, manual, automatic manual, etc. type of transmission. The transmission 52 may include one or more sensors (virtual or real) that couple to the controller 38 and provide information or data regarding operation of the transmission 52 (e.g., the current gear or operating mode, a temperature in the transmission box, etc.). These components may be controlled by the operator through the operator I/O device 122, which may be coupled to the controller 38, such that information may be exchanged between the controller 38 and the operator I/O device 122, wherein the information may relate to one or more components of FIG. 1 or determinations/commands/instructions/etc.

The vehicle 100 is also shown to include the exhaust aftertreatment system 18. The exhaust aftertreatment system 18 is in exhaust gas-receiving communication with the engine 14 and, in particular, with some or each cylinder bank 24. The exhaust aftertreatment system 18 includes a diesel particulate filter (DPF) 54, a diesel oxidation catalyst (DOC) 58, a selective catalytic reduction (SCR) system 62 with an SCR catalyst 66, and an ammonia oxidation (AMOx) catalyst 70. The SCR system 62 may further include a reductant delivery system that has a diesel exhaust fluid (DEF) source that supplies DEF to a DEF doser via a DEF line.

In operation and according to an example embodiment, combustion air enters the engine system 14 through an engine intake manifold 34 and flows to the plurality of cylinders 22. The engine 14 combusts the air and fuel to create power to propel the vehicle 100. The combustion gases (i.e., exhaust gases) are then vented away from the cylinders 22. In exhaust flow direction as indicated by directional arrow 84, exhaust gas flows from the engine 14 into inlet piping 86 of the exhaust aftertreatment system 18. From the inlet piping 86, the exhaust gas flows into the DOC 58 and exits the DOC 58 into a first section of exhaust piping 90A. From the first section of exhaust piping 90A, the exhaust gas flows into the DPF 54 and exits the DPF 54 into a second section of exhaust piping 90B. From the second section of exhaust piping 90B, the exhaust gas flows into the SCR catalyst 66 and exits the SCR catalyst 66 into the third section of exhaust piping 90C. As the exhaust gas flows through the second section of exhaust piping 90B, it may be periodically dosed with DEF by a DEF doser. Accordingly, the second section of exhaust piping 90B may also act as a decomposition chamber or tube to facilitate the decomposition of the DEF or another reductant to ammonia. From the third section of exhaust piping 90C, the exhaust gas flows into the AMOx catalyst 70 and exits the AMOx catalyst 70 into the outlet piping 94 before the exhaust gas is expelled from the exhaust aftertreatment system 18. Based on the foregoing, in the illustrated embodiment, the DOC 58 is positioned upstream of the DPF 54 and the SCR catalyst 66, and the SCR catalyst 66 is positioned downstream of the DPF 54 and upstream of the AMOx catalyst 70. However, in alternative embodiments, other arrangements of the components of the exhaust aftertreatment system 18 are also possible (e.g., the AMOx catalyst 70 may be excluded from the exhaust aftertreatment system 18, the relative positioning of the components may differ, etc.).

The DOC 58 may have any of various flow-through designs. Generally, the DOC 58 is structured to oxidize at least some particulate matter, e.g., the soluble organic fraction of soot, in the exhaust and reduce unburned hydrocarbons and CO in the exhaust to less environmentally harmful compounds. For example, the DOC 58 may be structured to reduce the hydrocarbon and CO concentrations in the exhaust to meet the requisite emissions standards for those components of the exhaust gas. An indirect consequence of the oxidation capabilities of the DOC 58 is the ability of the DOC 58 to oxidize NO into $NO_2$. In this manner, the level of $NO_2$ exiting the DOC 58 is equal to the $NO_2$ in the exhaust gas generated by the engine 14 plus the $NO_2$ converted from NO by the DOC 58.

The DPF 54 may be any of various flow-through designs, and is structured to reduce particulate matter concentrations, e.g., soot and ash, in the exhaust gas to, e.g., meet one or more requisite emission standards. According to various embodiments, the DPF 54 may include a cellular ceramic and/or metal honeycomb (e.g., comprising cordierite, silicon carbide, aluminum, etc.) with good thermal durability. The honeycomb design may define a plurality of channels. In operation, the DPF 54 may be structured to capture particulate matter within the filter pores such that particulate matter remains deposited on the walls of the plurality of channels an exhaust gas flows through. Generally, the DPF 54 needs to be periodically regenerated to burn off the captured particulate matter.

As discussed above and in this example configuration, the SCR system 62 may include a reductant delivery system with a DEF source, a pump, and a doser (not shown). The reductant source can be a container or tank capable of retaining a reductant, such as, for example, ammonia ($NH_3$), DEF (e.g., urea), or diesel oil. The reductant source is in reductant supplying communication with the pump, which is configured to pump reductant from the reductant source to the DEF doser via a reductant delivery line. The DEF doser is positioned upstream of the SCR catalyst 66. The controller is structured to control the timing and amount of the DEF delivered to the exhaust gas. In some embodiments, ammonia can be dispensed from the DEF dosers instead of or in addition to DEF. DEF decomposes to produce ammonia. As briefly described above, the ammonia reacts with NOx in the presence of the SCR catalyst 66 to reduce the NOx to less harmful emissions, such as $N_2$ and $H_2O$. The NOx in the exhaust gas stream includes $NO_2$ and NO. Generally, both $NO_2$ and NO are reduced to $N_2$ and $H_2O$ through various chemical reactions driven by the catalytic elements of the SCR catalyst 66 in the presence of $NH_3$.

The SCR catalyst 66 may be any of various known catalysts. For example, in some implementations, the SCR catalyst 66 is a vanadium-based catalyst, and in other implementations, the SCR catalyst is a zeolite-based catalyst, such as a Cu-Zeolite or a Fe-Zeolite catalyst. In one representative embodiment, the reductant is aqueous urea and the SCR catalyst 66 is a zeolite-based catalyst. In some embodiments, an efficiency of the SCR catalyst 66 is temperature dependent, meaning that the SCR catalyst is more efficient at reducing the NOx into less-harmful emissions at higher temperatures.

The AMOx catalyst 70 may be any of various flow-through catalysts configured to react with ammonia to produce mainly nitrogen. As briefly described above, the AMOx catalyst 70 is structured to remove ammonia that has slipped through or exited the SCR catalyst 66 without reacting with NOx in the exhaust. In certain instances, the exhaust aftertreatment system 18 can be operable with or without an AMOx catalyst. Further, although the AMOx catalyst 70 is shown as a separate unit from the SCR catalyst 66 in FIG. 1, in some implementations, the AMOx catalyst 70 may be integrated with the SCR catalyst 66, e.g., the AMOx catalyst 70 and the SCR catalyst 66 can be located within the same housing. In the example shown, the SCR catalyst 66 and AMOx catalyst 70 are positioned serially, with the SCR catalyst 66 preceding the AMOx catalyst 70.

As alluded to above, although the exhaust aftertreatment system 18 shown includes one of an DOC 58, DPF 54, SCR catalyst 66, and AMOx catalyst 70 positioned in specific locations relative to each other along the exhaust flow path, in other embodiments, the exhaust aftertreatment system 18 may include more than one of any of the various catalysts, less components, and/or the relative positions may differ. Further, although the DOC 58 and AMOx catalyst 70 are non-selective catalysts, in some embodiments, the DOC 58 and AMOx catalyst 70 can be selective catalysts.

The vehicle 100 is also shown to include various sensors. The sensors may be strategically disposed throughout the vehicle 100. For example, sensors may be strategically disposed throughout the exhaust aftertreatment system 18. For example, one or more sensors may be positioned upstream, downstream and/or on the DPF 54 to monitor various operating parameters of the DPF 54. In some embodiments, the sensors may be structured to detect particulate matter emissions downstream of the DPF 54 (e.g., particulate matter emissions exceeding a predetermined threshold). In some embodiments, the sensors may be structured to monitor the soot load on the DPF 54. For example, the sensors may be pressure sensors structured to aid in monitoring differential pressure across the DPF 54, radio frequency (RF) sensors structured to aid in monitoring the absorption of a microwave signal by soot accumulated in the DPF 54, etc. In some embodiments, the sensors may be resistive electrode sensors structured to aid in detecting malfunction and/or failure of the DPF 54 by measuring a change in resistance due to soot deposition on the DPF 54. In some embodiments, the sensors may employ particle charging methods used to detect particulate matter concentrations in exhaust gas flowing through the DPF 54. For example, a flow rate sensor may be used to determine a flow rate upstream of the DPF 54 and then downstream of the DPF 54 in order to determine a pressure drop or restriction imparted by the DPF 54. In other alternate embodiments, the sensors may be virtual sensors that utilize one or more formulas, algorithms, and/or processes for estimating or otherwise determining various operational characteristics of the, for example, DPF 54 (e.g., particulate matter loading, temperature, pressure difference, flow rate through the DPF, etc.).

The vehicle 100 is also shown to include a controller 38. The controller 38 is structured to control, at least partly, operation of the engine system 10 and associated subsystems, such as the internal combustion engine 14, the exhaust aftertreatment system 18, the driveline 50, and/or the operator I/O device 122. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network ("CAN") bus provides the exchange of signals, information, and/or data. The CAN bus includes any number of wired and wireless connections.

Because the controller 38 is communicably coupled to the systems and components of FIG. 1, the controller 38 is structured to receive data from one or more of the components shown in FIG. 1. For example, the data may include sensor data for the DPF 54. The controller 38 may be communicatively coupled to the sensors and structured to determine whether soot deposition on the DPF 54 or other operating parameters (e.g., the pressure delta, etc.) exceeds a predetermined threshold. Based on this determination, the controller 38 may be structured to trigger a fault signal via an on-board diagnostic (OBD) system. The fault signal may indicate to the operator that the DPF 54 may need to be serviced. In some embodiments, the fault signal triggers the CT scan-based diagnostic processes described further herein (e.g., the operator may remove the DPF 54, prepare appropriate DPF samples for CT scanning, and cause a computing system to perform CT scan-based diagnostic processes).

Figure 2:
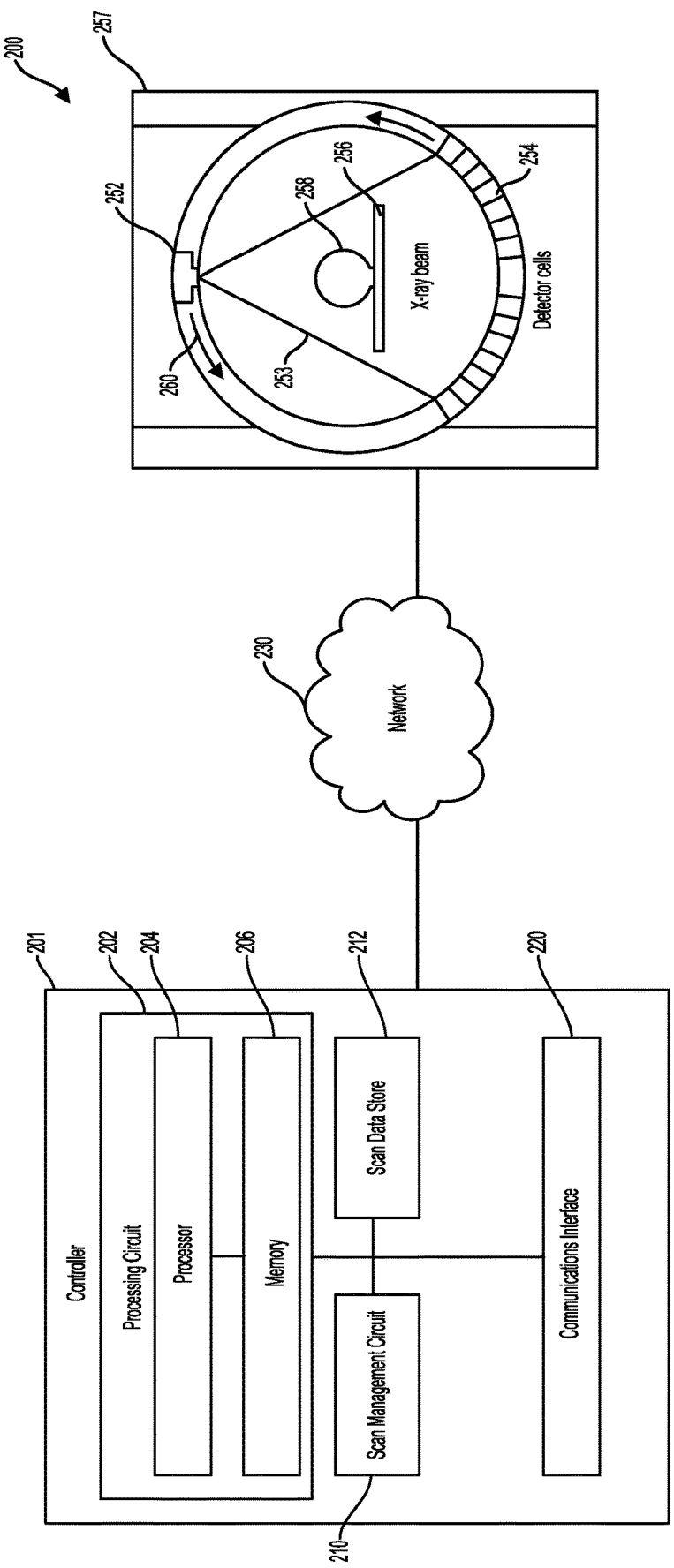
FIG. 2 is a schematic representation of a computing system for evaluating part density, contamination and defects using computed tomography (CT) scanning, according to an example embodiment.

Referring now to FIG. 2, a schematic representation of a computing system 200 for evaluating part density, contamination and defects using CT scanning is shown, according to an example embodiment. The computing system 200 is structured to perform various computer-executable processes for evaluating density, contamination and defects of various samples (parts of) a filter in an exhaust aftertreatment system, such as the DPF 54 described in reference to FIG. 1. As shown, the computing system 200 includes a controller 201, which is communicatively coupled, via a network 230, to a CT scanner 257.

As a general overview, the controller 201, described more particularly further herein, is structured to perform operations for evaluating (e.g., determining) part density, contamination and defects based on input received from the CT scanner 257. In some embodiments, the controller 201 is structured to transmit one or more electronic messages comprising part density and other information to the controller 38 of the vehicle 100. Based on this information, the contoller 38 may generate a fault alert, cause a regeneration of the DPF 54, etc.

In some embodiments, the input includes image data generated by the CT scanner 257. The CT scanner 257 may be any suitable CT scanning apparatus. As shown, an example CT scanner 257, shown in a schematic cross-sectional view, includes an X-ray source 252 and a plurality of detector cells 254. A sample 258 (e.g., a DPF sample and/or reference sample(s), as discussed further herein) is fixedly positioned on a scanning plate 256. In operation, the X-ray source 252 is structured to mechanically rotate about the sample 258, as shown by the directional arrow 260. The the X-ray source 252 emits an X-ray beam 253, which passes through the sample 258 and is detected by the detector cells 254. The detector cells 254 are communicatively coupled to a computing system, which may include the controller 201 or may be a separate system (not shown), and which generates at least one cross-sectional image of the sample 258. An example detector cell 254 may include a top scintillator layer structured to convert X-ray to light (optical photons), a middle photodiode layer structured to convert optical photons to current, and a bottom substrate layer structured to support the upper layers. The current may be sent to an analog electronic component to amplify, and the amplified signal may be digitized and transmitted to the computing system, which may be structured to generate one or more images based on the digitized signal.

As discussed above, in some embodiments, the controller 201 is communicatively coupled directly to the CT scanner 257 such that the controller 201 is part of the computing system local to the CT scanner 257. In other embodiments, the controller 201 is remote to the CT scanner 257 and is not included in the computing system associated with the CT scanner 257. In such configurations, the controller 201 receives image data via the network 230. The network 230 may be any type of type of network. For example, the network 230 may include a wireless network interface (e.g., 802.11X, ZigBee, Bluetooth, etc.), a wired network interface (e.g., Ethernet or other data communication protocol), or any combination thereof. The network 230 may include various communications equipment, such as routers, switches, etc. The network 230 may comprise the Internet. The image data may be received by the controller 201, over the network 230, via a suitable communication protocol, such as FTP, HTTP, HTTPS, IpSec, DICOM, etc. Image data generated by a computing system associated with the CT scanner 257 may be received by controller 201 in various suitable formats, such as JPEG, IMG, TIFF, etc. In an example embodiment, image data (e.g., pixel values, etc.) and metadata (e.g., header information such as the scan date, sample identifier (s), reference stack identifier(s), etc.) for a particular CT scan may be included in a single image data file (e.g., if an image is transmitted in DICOM or similar format). In other embodiments, the metadata may be included in a separate text file or omitted. The image data may be stored in the scan data store 212 as discussed further herein.

As shown, the controller 201 includes a processing circuit 202, which includes a processor 204 and a memory device 206. The controller 201 further includes a scan management circuit 210 and a scan data store 212. The controller 201 further includes a communications interface 220.

The processing circuit 202 may be structured or configured to execute or implement the instructions, commands, and/or control processes described herein with respect to the scan management circuit 210 and scan data store 212. Thus, the depicted configuration represents the scan management circuit 210 and scan data store 212 being embodied as machine or computer-readable media, which may be stored by the memory device 206. However, this illustration is not meant to be limiting as the present disclosure contemplates other embodiments where, for example, the scan management circuit 210 can be configured as a discrete hardware unit. All such combinations and variations are intended to fall within the scope of the present disclosure.

The processor 204 may be implemented as a single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A processor may be a microprocessor, or any conventional processor, or state machine. The processor 204 also may be implemented as a combination of computing devices, such as a combination of a digital signal processor (DSP) and a microprocessor, a plurality of microprocessors, one or more microprocessors in conjunction with a DSP core, or any other such configuration. In some embodiments, the one or more processors may be shared by multiple circuits, may comprise or otherwise share the same processor which, in some example embodiments, may execute instructions stored, or otherwise accessed, via different areas of memory. Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device 206 (e.g., memory, memory unit, storage device) may include/be one or more devices (e.g., RAM, ROM, Flash memory, hard disk storage) for storing data and/or computer code for completing or facilitating the various processes, layers and modules described in the present disclosure. The memory device 206 may be coupled to the processor 204 to provide computer code or instructions to the processor 204 for executing at least some of the processes described herein. Moreover, the memory device 206 may be or include tangible, non-transient volatile memory or non-volatile memory. Accordingly, the memory device 206 may include database components, object code components, script components, or any other type of information structure for supporting the various activities and information structures described herein.

The scan management circuit 210 is structured to perform operations for evaluating (e.g., determining) part density, contamination and defects based on input received from the CT scanner 257 and/or retrieved from the scan data store 212.

In some embodiments, the scan management circuit 210 may be structured to perform operations related to the density reference-based method for evaluating DPF sample density (e.g., particulate matter mass divided by particulate matter volume). For example, the scan management circuit 210 may be structured to determine, using an appropriate image analysis technique, that one or more reference samples have been positioned proximate to a DPF sample. The scan management circuit 210 may be structured to determine a region of interest in the CT scan-based image. The region of interest may comprise a grayscale image of the entire or partial DPF sample. The scan management circuit 210 may be structured to determine a sample grayscale value (e.g., an average grayscale value across a plurality of pixels) within the region of interest. In an example embodiment, the grayscale value is a numerical value that represents the brightness of a particular pixel. The grayscale value can be stored on the memory device 206 as an 8-bit integer, giving a range of possible grayscale values from 0 (black) to 255 (white).

The scan management circuit 210 may be structured to identify a reference region in the CT scan-based image. The reference region may comprise a grayscale image of the one or more reference samples, as described further herein. The scan management circuit 210 may be structured to determine a reference grayscale value (e.g., an average grayscale value across a plurality of pixels) within the reference region. In some embodiments, the scan management circuit 210 is structured to segment the reference region into a plurality of reference areas, each reference area having a particular reference grayscale value (e.g., an average grayscale value, a mean grayscale value, a median grayscale value, etc.) or a range of grayscale values (e.g., a range including the minimum and the maximum grayscale value, an Nth percentile grayscale value range, etc. for all the pixels or for a representative sample of pixels in the particular reference area).

In some embodiments, the scan management circuit 210 is structured to compare the sample grayscale value to the reference grayscale value or range for each particular reference area to determine which reference area most closely corresponds to the sample. Based on this determination, the scan management circuit 210 may be structured to reference the metadata associated with the particular reference area to identify the corresponding density range for a reference sample shown in the reference area of the image. The corresponding density range may be further correlated to an estimated particulate matter load (e.g., ash, soot, etc.) for the DPF sample (that is, to estimate the particulate matter load in kg/m$^3$).

In some embodiments, the scan management circuit 210 is structured to perform operations related to a dual energy scan-based method for evaluating DPF sample density. The scan management circuit 210 may be structured to retrieve from the scan data store 212 a first CT scan-based image generated at a first energy level and a second CT scan-based image generated at a second energy level. The first image and the second image include the same DPF sample. The scan management circuit 210 may be structured to identify a common region of interest between the two images. The common region of interest comprises the DPF sample. The common region of interest may be identified by the first set of relative (image-specific) coordinates (e.g., top left, top right, bottom left, bottom right) corresponding to the first image and the second set of coordinates corresponding to the second image.

In some embodiments of the dual energy scan method, a reference sample may be used such that an image of the reference sample may be included in the first image and in the second image. In such embodiments, the scan management circuit 210 may be structured to identify reference areas within the first image and/or the second image, determine the grayscale value(s) for the region of interest within the first image and/or the second image, determine the corresponding reference grayscale value(s) and/or range, select the corresponding reference area based on this determination, correlate the reference area to reference sample-related information (e.g., estimated soot load, known mean atomic number of material/particulate matter included in the sample, etc.) and determine the density of the DPF sample based on the correlation. In some embodiments, the contaminant element (e.g., phosphorus, etc.) may be determined based on the known atomic number in the corresponding reference sample. The correlation-related data may be stored in the scan data store 212 and may be referenced by the scan management circuit 210 to the metadata associated with particular images, particular reference samples, etc. The metadata may be stored relationally to various scan energy levels such that, for example, only one of the first image and the second image may need to be used. The reference sample-based approach provides additional verification information and/or allows one to determine the density based on a single image scanned at a first known energy level if the second image scanned at a second known energy level is compromised.

In other embodiments of the dual energy scan method, a reference sample may not be used. The attenuation coefficient of photons detected by the detector cells 254 will change according to the density of the scanned sample. More specifically, according to the Beer-Lambert Law, $$\frac{I}{I_0} = e^{-\mu t}, \tag{1}$$

where I=intensity of transmitted X-rays, $I_0$=intensity of incident X-rays, µ=linear attenuation coefficient for the material included in the sample, and t=thickness of material through which the X-rays have travelled. Attenuation by absorption and scattering can be determined using the following equation:

$$\mu = \rho \propto \frac{Z^k}{E^l} + \beta \rho, \tag{2}$$

Where µ=linear attenuation coefficient at X-ray energy level E, $\rho \propto z^k/g^l$=photoelectric absorption term, $\beta\rho$=Compton scattering term, Z=atomic number of the absorber, $\beta$=scattering attenuation constant, and $\propto$=photoelectric constant. Accordingly, even without a reference sample, the scan management circuit 210 may be structured to determine the density of a scanned DPF sample using a dual energy scan method. It follows from (2) above that:

$$\frac{\mu_1}{\mu_2} = \frac{\rho_1\left(\propto \frac{Z^k}{E^l} + \beta\right)1}{\rho_2\left(\propto \frac{Z^k}{E^l} + \beta\right)2} = \frac{\rho_1}{\rho_2}, \quad (3)$$

Equation (3) is used in in embodiments where only one scan is needed, and deposit density is linearly related to CT image grayscale. According to an embodiment, the linear relationship between gray scale and deposit density can be obtained from density reference samples attached to DPF as demonstrated in FIG. 3D. In other embodiments (e.g., in dual energy scans, where the attenuation coefficient can be directly obtained from CT and no reference sample is used); the deposit density and mean atomic number in DPF can be calculated as follows.

For two scans at two different energy levels, a mean atomic number, approximating density, can be calculated based on the attenuation coefficient delta (the change in the attenuation coefficient between the two scans). The scan management circuit 210 can be structured to determine a first attenuation coefficient for the region of interest showing the DPF sample in the first image:

$$\frac{\mu_A}{\rho} = \propto \frac{Z_m^k}{E_A^l} + \beta, \quad (4)$$

The scan management circuit 210 can be structured to then determine a second attenuation coefficient for the region of interest showing the DPF sample in the second image:

$$\frac{\mu_B}{\rho} = \propto \frac{Z_m^k}{E_B^l} + \beta, \quad (5)$$

It follows from (4) and (5) above that the mean atomic number, and therefore density of the DPF sample, can be determined from the attenuation coefficient change:

$$\rho = \frac{\mu_A - c\mu_B}{(1-c)\beta}, \quad (6)$$

where $$c = \frac{E_B^l}{E_A^l}, \quad (7)$$

and therefore $$Z_m^k = \left(\frac{\mu_A}{\rho} - \beta\right)\frac{E_A^l}{\propto}, \quad (8)$$

Figure 4A:
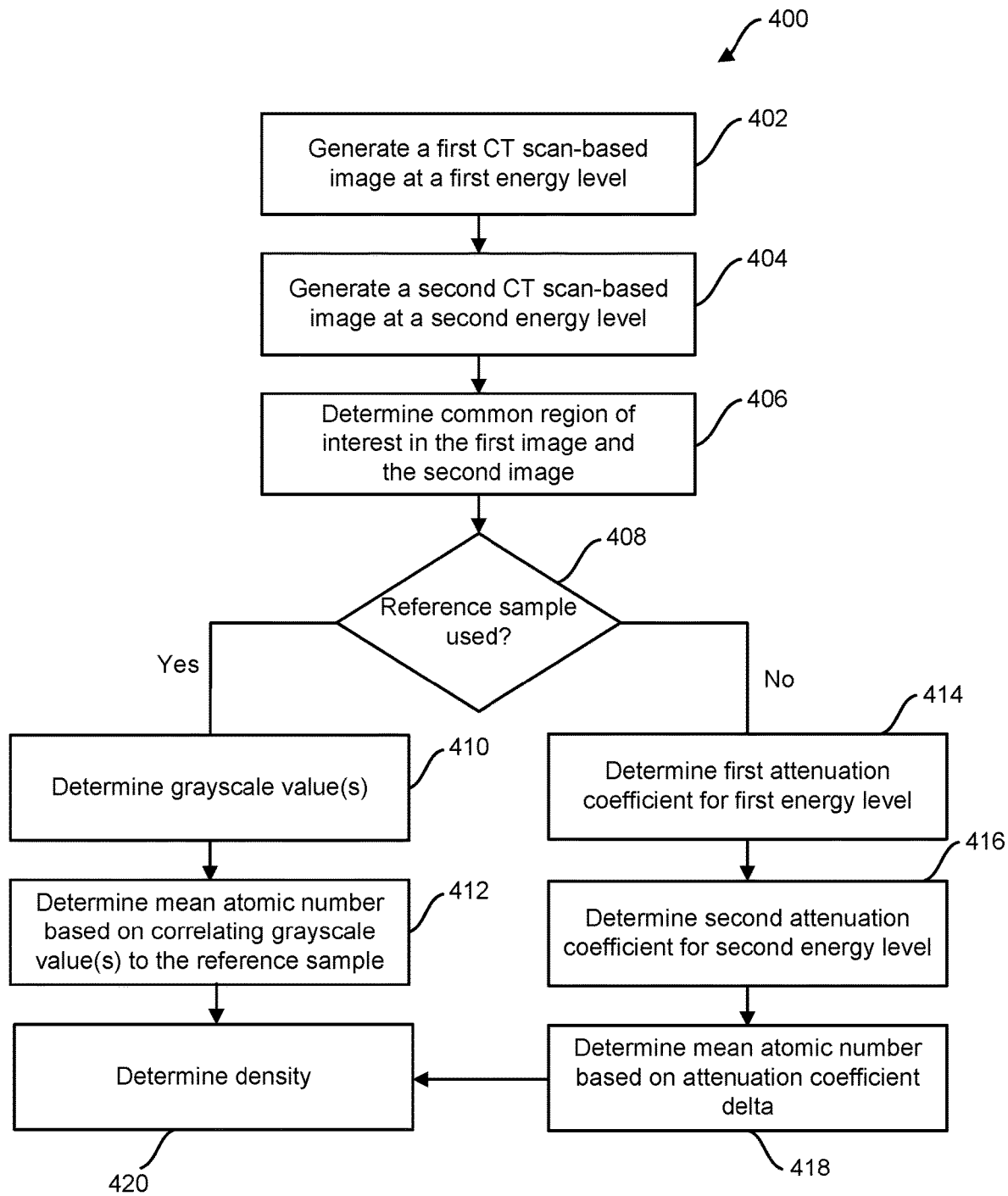
FIG. 4A is a flow diagram of a dual energy scan-based method for evaluating part density, contamination and defects using CT scanning, according to an example embodiment.

In this case, material constants $\alpha$ and $\beta$ can be obtained from density reference samples based on Equations (4-5) in dual energy scan. Further, if the attention coefficient from CT-scan is not readily available and the reference samples are used as shown in FIG. 4A, the method presented above is still useful. However, additional work is needed to determine the relationship between gray scale and attenuation coefficient as demonstrated in Eq. (9-10). Here $\rho_i$ and $gs_i$ are density and gray scale of reference sample i. $a_1$, $b_1$, $k_A$ and $a_2$, $b_2$, $k_B$ are constants that can be found out through linear regression of reference sample data in two energy scans, respectively:

$$\mu_A = k_A * \rho_i = a_1 gs_i b_1 \quad (9)$$

$$\mu_B = k_B * \rho_i = a_2 gs_i + b_2 \quad (10)$$

The scan management circuit 210 can be structured to determine an attenuation coefficient change (delta) by applying, for example, expressions (6) and (7) above to the image data from the first scan and the second scan. The scan management circuit 210 can determine a mean atomic number for the region of interest based on the attenuation coefficient delta by applying, for example, expression (8) above, and to determine the density and/or contaminant type based on the mean atomic number (e.g., by cross-referencing the mean atomic number to other relevant data as described above).

All or some of the above operations can be performed by the the scan management circuit 210 automatically and/or with the assistance of an operator. In some embodiments, the scan management circuit 210 may comprise image processing software, which may perform initial pre-processing (e.g., region selection, reference area selection, etc.) of a CT scan-based image. The selections may be further refined and/or modified by the operator via an input/output device of computing device communicatively coupled to or comprising the controller 201.

The image data, image metadata, code libraries comprising executables with expression definitions such as those for (1)-(8) above, intermediate processing output, and/or final processing output may be stored by the scan management circuit 210 in the scan data store 212. More generally, the scan data store 212 is structured to store, manage, and facilitate retrieval of information related to evaluating part density, contamination and defects based on input received from the CT scanner 257. The scan data store 212 may be any device suitable for storing computer readable data between power cycles. In some implementations, the scan data store 212 is a device with fixed storage media, such as magnetic disks, e.g., a hard disk drive (HDD). In some implementations, the scan data store 212 is a device with removable storage media, such as magnetic disks (e.g., a floppy disk drive or removable HDD), magnetic tape, magneto-optical disks, or optical discs (e.g., CD ROM, DVD-ROM, or BLU-RAY discs). In some implementations, the scan data store 212 is a non-volatile semiconductor memory device such as an erasable programmable read-only memory (EPROM), electrically erasable programmable read-only memory (EPROM), or Flash memory. In some implementations, the main memory is a solid-state drive (SSD), e.g., using multi-level cell (MLC) NAND-based Flash memory.

In some embodiments, the scan data store 212 is a database. Generally, a database, or more specifically a database management system (DBMS), organizes data in accordance with a database definition, e.g., a database schema. For example, in a relational database, the DBMS maintains data in a table-like data structure. Each table has columns, each corresponding to an entry type, classification, or purpose. For example, a table might have a column for numerical data, a column for text data (e.g., a description of the numerical data), a column for date data, and so forth. In some implementations, a column represents structured data grouping multiple data elements into a single column. In a relational database, each entry in a column in a table is also in a row associating the entry with entries from other columns in the table. In some instances, an entry (or combination of entries) will associate a row from one table with one or more rows in another table. In some DBMS implementations, virtual tables called "views" represent data pulled from one or more tables as though it, too, were a table (that is, the view looks to a database client or user as though it was a table, but is not necessarily stored as such). Other types of database management systems can also be used, including various types of relational databases, object oriented databases, document oriented databases, eXtensible Markup Language (XML) databases, NoSQL databases, and so forth. Many of these database types use tables, or table-like structures, in a manner similar to that described above in reference to relational databases. In some database implementations, data is stored or represented in a manner other than a table, e.g., as a collection of data tuples.

As shown, the controller 201 further includes a communications interface 220. The communications interface 220 is structured to enable the controller 201 to communicate with external systems via the network 230. The communications interface 220 may include wired and/or wireless interfaces (e.g., jacks, antennas, transmitters, receivers, transceivers, wire terminals, etc.) for conducting data communications with/over these various systems, devices, or networks. For example, the communications interface 220 may include a Wi-Fi transceiver for communicating via a wireless communications network. The communications interface 220 may be structured to communicate via local area networks or wide area networks (e.g., the Internet, etc.) and may use a variety of communications protocols (e.g., TCP/IP, local operating network (LON), controller area network (CAN), J1939, local interconnect network (LIN), Bluetooth, ZigBee, radio, cellular, near field communication, etc.).

Figure 3A:
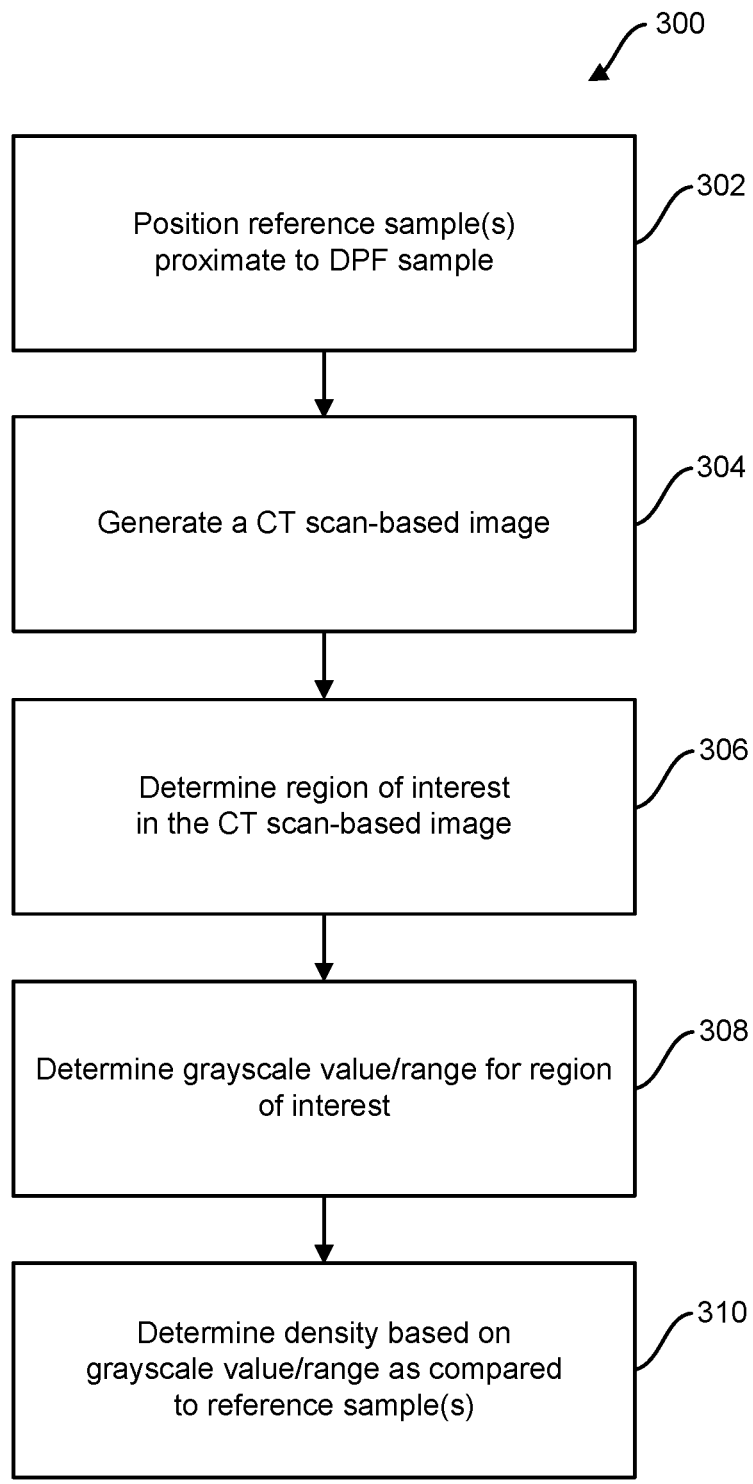
FIG. 3A is a flow diagram of a density reference-based method for evaluating part density, contamination and defects using CT scanning, according to an example embodiment.
Figure 3C:
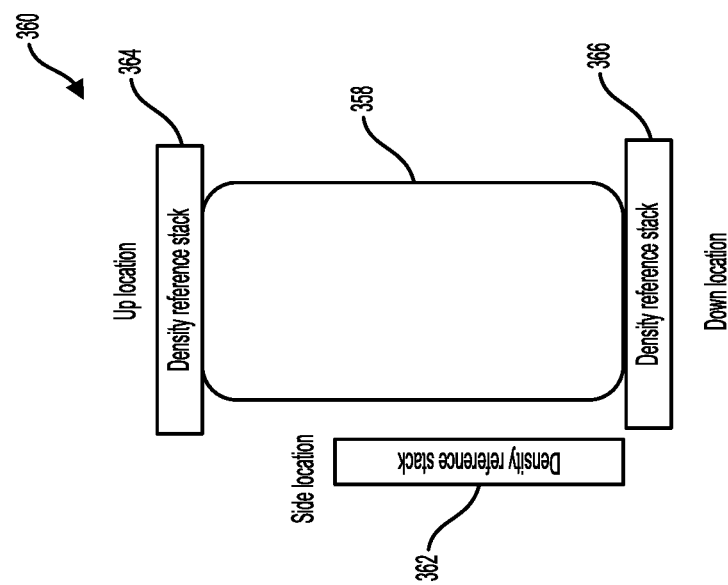
FIG. 3C is a diagram showing example positioning options for a reference sample stack shown in the example CT scan-based image of FIG. 3B, according to an example embodiment.
Figure 3B:
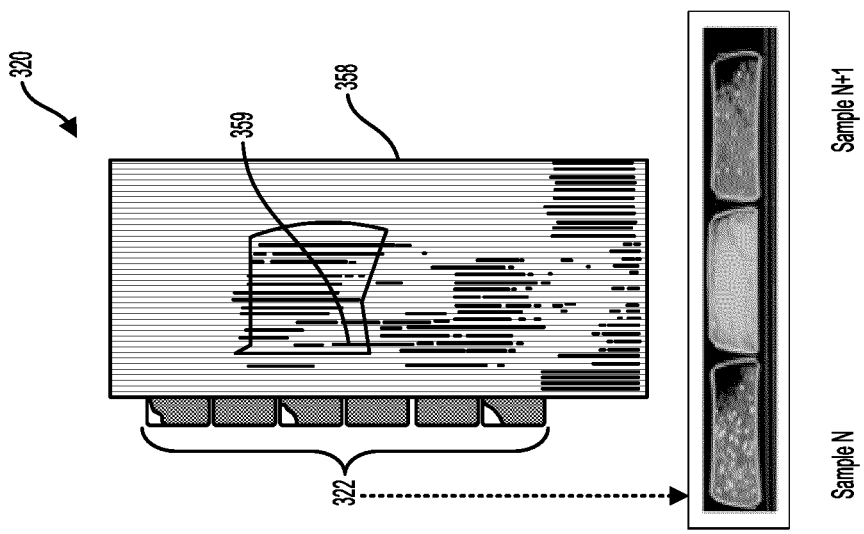
FIG. 3B shows an example CT scan-based image generated using an example method described relative to FIG. 3A, according to an example embodiment.
Figure 3D:
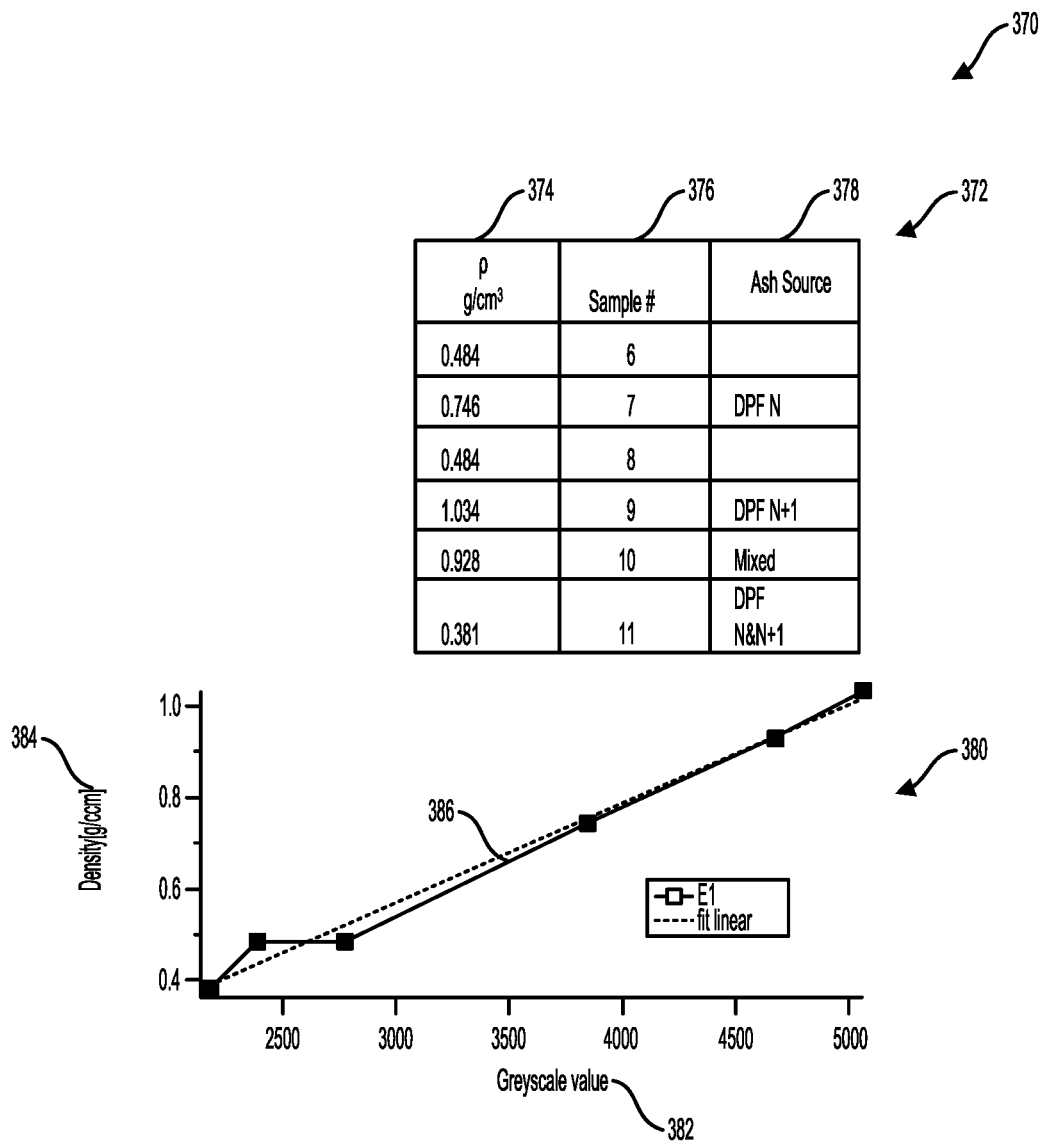
FIG. 3D shows the relationship between DPF sample density and a range of grayscale values, according to an example embodiment.

Referring now to FIGS. 3A-3C, FIG. 3A is a flow diagram of a density reference-based method 300 for evaluating part density, contamination and defects using CT scanning, according to an example embodiment. The operations of the method 300 may include positioning one or more reference samples proximate to a DPF sample, generating a CT scan-based image comprising the DPF sample and the reference sample(s), determining a region of interest in the CT scan-based image, determining a grayscale value or range within the region of interest, and determining the density value. As used herein, the term "density" is used synonymously with the term "contamination level" and is reflective of a particulate matter load level on the DPF sample obtained from a DPF.

Method 300 may include, at 302, operations comprising positioning one or more reference samples proximate to a DPF sample. In some embodiments, an operator manually positions the samples. Generally, a reference sample is a DPF sample (e.g., a metal capsule containing burned-off particulate matter) that contains a specific pre-determined level of a known contaminant. As shown in FIG. 3B, a plurality of reference samples, each representing a different level of contamination, may be arranged in a reference sample stack 322 (e.g., in the increasing order of density). FIG. 3C is a diagram showing example positioning options for the reference sample stack relative to the DPF sample 358. As shown, example positioning options may include side 362, top 364, and/or bottom 366 relative to the DPF sample 358.

Method 300 may include, at 304, operations comprising generating a CT scan-based image. As shown in FIG. 3B, an example CT scan-based image 320 comprises both the DPF sample 358 and the reference sample stack 322. The operations may further include transmitting the CT scan-based image, via a network, to a circuit associated with a controller, such as the scan management circuit 210 of the controller 201 of FIG. 2. In some embodiments, the scan management circuit 210 of FIG. 2 may be structured to pre-process the CT scan-based image 320 in order to verify quality characteristics of the CT scan-based image 320, such as resolution, a substantially visible DPF sample 358 sufficient to perform the density analysis, a substantially visible reference sample stack 322, etc.

Method 300 may include, at 306, operations comprising determining a region of interest 359 in the CT scan-based image 320, as shown in FIG. 3B. In some embodiments, the scan management circuit 210 may perform further pre-processing of the CT scan-based image 320. Further pre-processing may comprise a programmatically-driven recommendation of the region of interest 359. For example, region of interest 359 may be selected by determining a grayscale value of a representative sample of pixels, determining that a subset of the representative sample of pixels have substantially similar grayscale values (e.g., values within a tolerance threshold for a grayscale value that falls in the range of 0-255, such as 10, 15, 20, etc.), determining the coordinates for the subset of pixels, and determining the region of interest 359 based on the coordinates. The recommended region of interest 359 may be further refined and/or modified by the operator via an input/output device of computing device communicatively coupled to the controller 201.

Method 300 may include, at 308, operations comprising determining a grayscale value or range for pixels within the region of interest. In some embodiments, the grayscale value is an average grayscale value for all or a representative number of pixels (e.g., 80%, 90%, 95%, etc.). In some embodiments, the grayscale value is a range of grayscale values for the representative number of pixels (e.g., min-max, $10^{th}$ percentile-$90^{th}$ percentile, $25^{th}$ percentile-$75^{th}$ percentile, etc.) In some embodiments, the parameters and expressions used to determine the grayscale value are retrieved by the scan management circuit 210 from the scan data store 212. In some embodiments, the parameters and expressions to use are determined based on a quality-related property of the CT scan-based image 320, such as resolution. For example, an image scanned at a higher resolution may have greater variability in grayscale values among the representative pixels, and data cleansing techniques (such as outlier removal, using a narrower percentile range, etc.) may be applied to the set of grayscale values prior to determining a match to one of reference samples from the reference sample stack 322.

Method 300 may include, at 310, operations comprising determining the density of the DPF sample 358. In some embodiments, the operations at 310 may comprise segmenting the reference sample stack 322 into a plurality of reference areas. The operations may comprise determining a grayscale value/range of each reference area and selecting the reference area with a grayscale value/range that most closely corresponds to the grayscale value or range for pixels within the region of interest 359. As shown in graph 380 of FIG. 3D, the relationship 386 between grayscale value(s) 382 and DPF sample density 384 is substantially linear. Therefore, grayscale values in reference samples can be reliably correlated to a particular density or contamination level of the DPF sample 358.

Figure 4B:
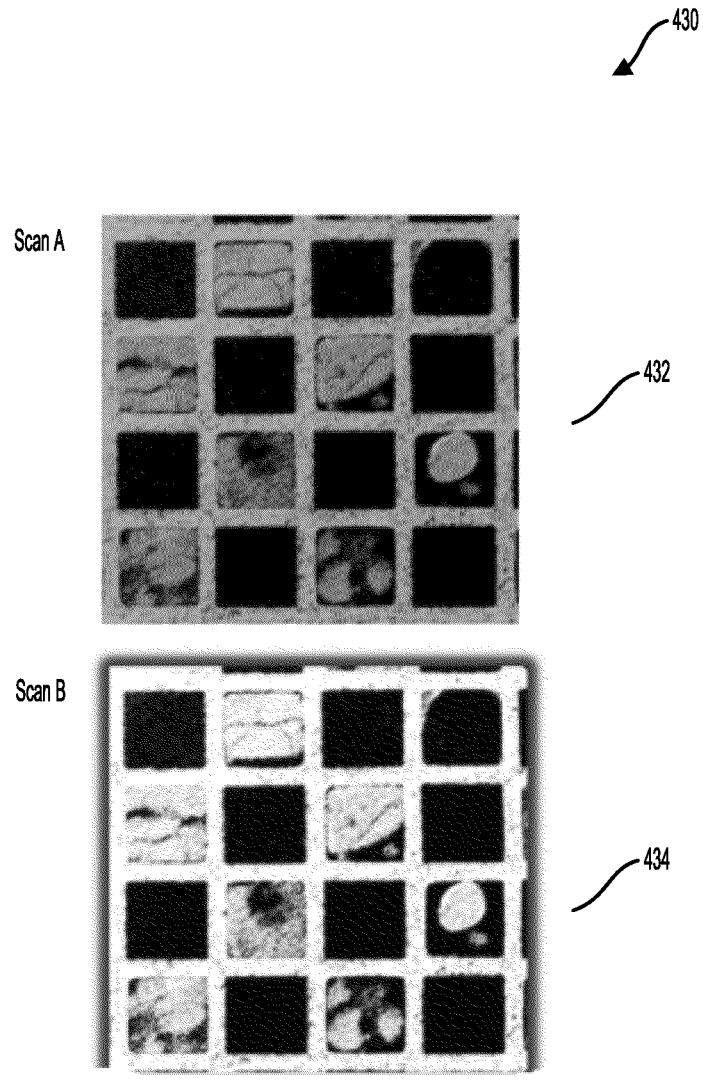
FIG. 4B shows example CT scan-based images generated using an example method described relative to FIG. 4A, according to an example embodiment.

Referring now to FIGS. 4A and 4B, FIG. 4A is a flow diagram of a dual energy scan-based method 400 for evaluating part density, contamination and defects using CT scanning, according to an example embodiment. The operations of the method 400 may include generating a first CT scan-based image and a second CT scan-based image of a DPF sample at different energy levels, determining a common region of interest, determining a mean atomic number for the region of interest, and determining the density of the DPF sample and/or the contaminant type based on the mean atomic number. Example first and second CT scan-based images are shown in FIG. 4B.

Method 400 may include generating a first CT scan-based image (e.g., scan A 432 shown in FIG. 4B) at a first energy level, at 402, and generating a second CT scan-based image (e.g., scan B 434 shown in FIG. 4B) at a second energy level different from the first energy level, at 404. Appropriate energy levels may be selected based on operating characteristics of the CT scanner 257 of FIG. 2, with a goal of producing scan A 432 and scan B 434 that are sufficiently distinct. The threshold for the images being substantially distinct may be determined, for example, by determining a grayscale value for each representative pixel for scan A 432, identifying the minimum and the maximum values (or percentile range values as described above), and calculating a first contrast value (the difference between the minimum and maximum values). In some embodiments, various additional image analysis techniques can be used, such as performing the above processes for segments within scan A 432, using grayscale value histograms, calculating a mean contrast or intensity value across pixels, etc. Similar operations can be performed to generate a second contrast value. The operations may further include determining the difference between the first contrast value and the second contrast value and ensuring that the difference meets or exceeds a predetermined threshold. A higher threshold corresponds to a greater difference in contrast between the two images. In some embodiments, the threshold is an integer value selected from a range of 0-255.

Method 400 may include, at 406, determining a common region of interest between the two images. The common region of interest may comprise the entire DPF sample or a portion of DPF sample. The common region of interest may be identified at least in part by the first set of coordinates corresponding to the first image and the second set of coordinates corresponding to the second image.

Method 400 may include, at 408, determining whether a reference sample is used. Using reference samples, such as the reference sample stack 322 from FIG. 3B, provides an additional method for determining the density of the DPF sample if one of the first CT scan-based image and the second CT scan-based image is compromised, or if the images are not sufficiently distinct.

If a reference sample is used, the method 400 may include, at 410, determining grayscale value or range for all or some pixels within the region of interest as described, for example, relative to 308 of method 300 shown in FIG. 3A. The method 400 may further include, at 412, determining a mean atomic number for the region of interest based on the grayscale value or range. In some embodiments, a cross-reference repository correlating mean atomic numbers and reference sample identifiers (which can be determined, for example, based on image metadata, where each reference sample in the reference sample stack can be identified by a set of coordinates, by its mean grayscale value, and/or manually tagged by the operator using the scanner 257, etc.) are stored in the scan data store 212 of FIG. 2 and can be accessed to determine the mean atomic number for the reference sample that most closely matches the region of interest. The mean atomic number can be used to determine the density and/or contaminant type as described in relation to operations 420.

If a reference sample is not used, the method 400 may include, at 414, determining the first attenuation coefficient for the first CT scan-based image and, at 416, determining the second attenuation coefficient for the second CT scan-based image. The method 400 further includes, at 418, calculating the attenuation coefficient delta and determining the mean atomic number for the region of interest based on the attenuation coefficient delta. In some embodiments, code libraries comprising executables with expression definitions for programmatically determining the mean atomic number(s) based on image analysis (such as those discussed in relation to FIG. 2) can be stored by the scan management circuit 210 in the scan data store 212. These code libraries may be retrieved and used at runtime to programmatically determine the attenuation coefficient(s).

The method 400 may include, at 420, determining the density within the region of interest based on the mean atomic number. In some embodiments, the scan data store 212 can maintain a cross-reference table for mean atomic numbers and their corresponding elements and/or densities. The contaminant element may be determined based on the known atomic number by querying the cross-reference table using the mean atomic number. In some embodiments, the mean atomic number is only retained in transitory memory (e.g., cached) during runtime. In other embodiments, the mean atomic number is stored in the scan data store 212 relationally to the appropriate images (e.g., to the first CT scan-based image and the second CT scan-based image) and/or as metadata for the appropriate images such that the information remains regarding atomic numbers for previously processed images remains accessible at a later date. In some embodiments, a particular image may be included in more than one different image pairs and the metadata or relational table may include an image pair identifier and the corresponding mean atomic number. In some embodiments, the scan data store 212 can be queried to retrieve and normalize the set of mean atomic numbers for multiple image pairs (for example, for images that show the same physical DPF samples) such that the mean atomic number and the corresponding contaminant is determined with greater precision. In some embodiments, the scan management engine 210 includes a recommendation engine that can be structured to determine the most likely contaminant based on, for example, determining the closest mean atomic number for a calculated mean atomic number value that does not directly correspond to any known mean atomic numbers or contaminants.

Figure 5:
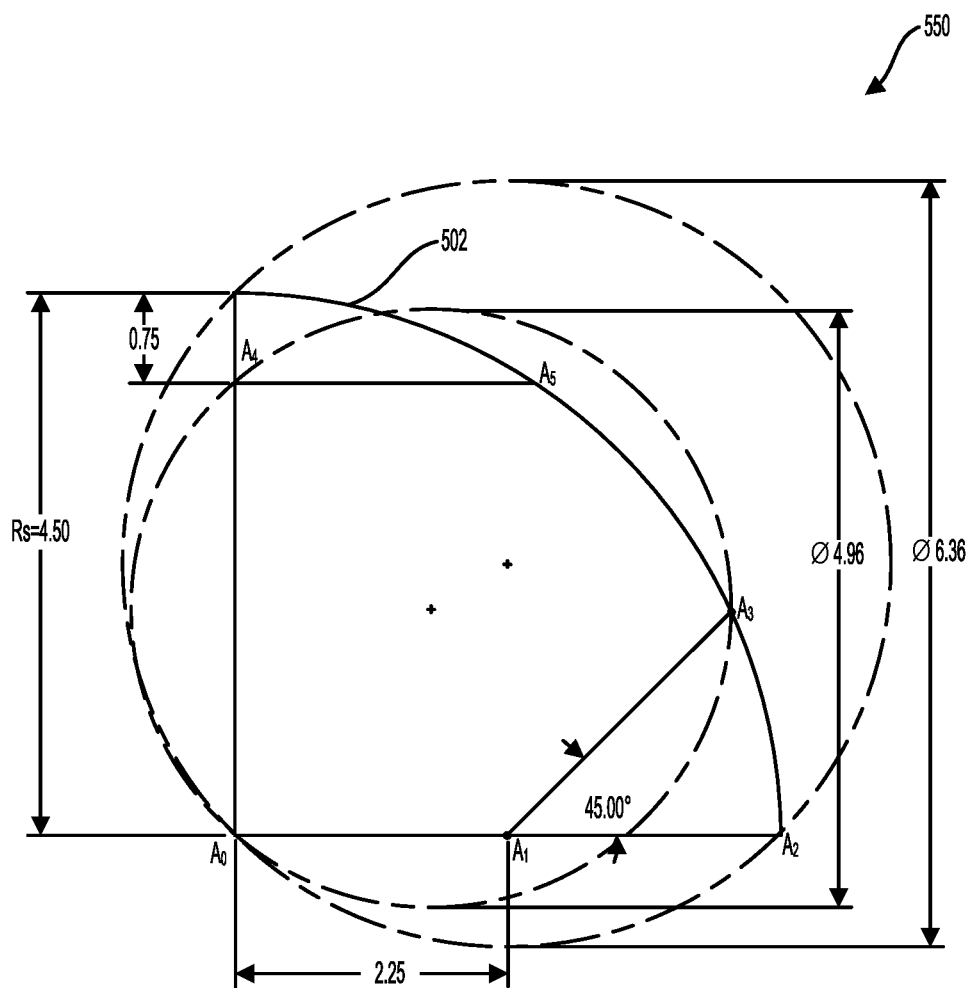
FIG. 5 shows an example optimized DPF sample for improved density evaluation, according to an example embodiment.

Referring now to FIG. 5, aspects of optimizing the properties of a DPF sample (e.g., the shape of the DPF sample) are shown, according to an example embodiment. The resolution of an image decreases as the radii of substantially circular DPF samples increase. As shown in FIG. 5, a DPF sample 550 can be structured to have a shape advantageous to maximizing the resolution of a CT scan-based image that comprises the sample while reducing the size of the DPF sample 550 to facilitate sample management and storage. As shown, in one example embodiment, the DPF sample 550 is a quadrant (defined by a 45-degree angle $A_2A_0A_4$ comprising the radii of a substantially circular segment of a DPF (e.g., the DPF 54 of FIG. 1). To reduce the size of the DPF sample 550 without reducing the resolution of the corresponding image, the edge $A_0A_2$ can be cut in half, producing segments $A_0A_1$ and $A_1A_2$. The quadrant can then be reduced in size to produce the first edge $A_1A_3$ by trimming the quadrant-shaped sample at a first angle (e.g., a 45-degree angle) and by producing the second edge $A_4A_6$ at the opposite end of the sample. In the resulting DPF sample 550, portions that do not contribute to improving image resolution are therefore removed.

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional high members. For example, circuit A communicably "coupled" to circuit B may signify that circuit A communicates directly with circuit B (i.e., no intermediary) or communicates indirectly with circuit B (e.g., through one or more intermediaries).

As mentioned above and in one configuration, the "circuits" may be implemented in machine-readable medium for execution by various types of processors. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example, the one or more processors may be a remote processor (e.g., a cloud based processor). Alternatively, or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Although the diagrams herein may show a specific order and composition of method steps, the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. All such modifications are intended to be included within the scope of the present disclosure as defined in the appended claims. Such variations will depend on the machine-readable media and hardware systems chosen and on designer choice. All such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method for determining a density of particulate matter in a particulate filter sample, the method comprising:
    generating, by a controller included in a computing system, a computed tomography (CT) scan-based image of the particulate filter sample;
    segmenting, by the controller, the CT scan-based image of the particulate filter sample into a plurality of regions; and
    for at least one region from the plurality of regions,
        determining, by the controller, a density of a portion of the particulate filter sample corresponding to the at least one region of the CT scan-based image of the particulate filter sample by:
            determining, by the controller, a grayscale value for the at least one region of the plurality of regions in the particulate filter;
            determining, by the controller, a reference value for the at least one region based on a reference sample;

comparing, by the controller, the grayscale value to the reference value, wherein the reference value is correlated to a certain density level;

determining, by the controller, the density based on the comparison to the reference value which indicates the density level; and causing, by the controller, an electronic display of a user device to display the CT scan-based image comprising the at least one region and an indication of the density for the at least one region.

2. The method of claim 1, further comprising:

positioning a reference stack comprising a plurality of reference samples proximate to the particulate filter sample prior to generating the CT scan-based image, wherein the CT scan-based image corresponds to a plurality of reference values, each reference value corresponding to a particular reference sample; and determining the reference value, comprising selecting from the plurality of reference values the reference value corresponding to the grayscale value.

3. The method of claim 1, wherein the CT scan based image of the particulate filter sample is a first CT scan based image generated at a first energy level, the method further comprising:

generating a second CT scan based image of the particulate filter sample at a second energy level different from the first energy level, the at least one region is common to the first CT scan based image and the second CT scan based image;

determining a mean atomic number for the at least one region; and determining the density of the portion of the particulate filter sample.

4. The method of claim 3, wherein determining the mean atomic number for the at least one region further comprises:

determining a first attenuation coefficient for the first energy level;

determining a second attenuation coefficient for the second energy level; and determining an attenuation coefficient delta between the first attenuation coefficient and the second attenuation coefficient; and determining the mean atomic number based on the attenuation coefficient delta.

5. The method of claim 4, wherein at least one of the first attenuation coefficient and the second attenuation coefficient is determined using at least one reference sample.

6. The method of claim 3, further comprising determining at least one of a contamination level and a contaminant within the portion of the particulate filter sample by correlating the mean atomic number to a known contaminant.

7. The method of claim 1, further comprising programmatically identifying the at least one region from the plurality of regions as a region of interest.

8. The method of claim 1, wherein the particulate filter sample is structured to maximize a resolution of the CT scan-based image.

9. The method of claim 8, wherein the particulate filter sample is a quadrant of a substantially circular segment of a diesel particulate filter, the method comprising:

determining at least one portion of the quadrant that is not essential to improving the resolution; and trimming the at least one portion to reduce a size of the particulate filter sample.

10. A computer system structured to determine a density of particulate matter in a diesel particulate filter (DPF) sample, the computer system comprising a processing circuit having a processor and a memory, the processing circuit structured to:

generate a computed tomography (CT) scan-based image of the DPF sample;

segment the CT scan-based image of the DPF sample into a plurality of regions; and for at least one region from the plurality of regions, determine a density of a portion of the DPF sample corresponding to the at least one region of the CT scan-based image of the DPF sample by:

determining a grayscale value for the at least one region of the plurality of regions in the particulate filter;

determining a reference value for the at least one region based on a reference sample;

comparing the grayscale value to the reference value, wherein the reference value is correlated to a certain density level; and determining the density based on the comparison to the reference value which indicates the density level; and cause an electronic display of a user device communicatively coupled to the computer system to display the CT scan-based image comprising the at least one region and an indication of the density for the at least one region.

11. The computer system of claim 10, wherein the CT scan based image of the DPF sample is a first CT scan based image generated at a first energy level, and wherein the processing circuit is further structured to:

generate a second CT scan based image of the DPF sample at a second energy level different from the first energy level, the at least one region is common to the first CT scan based image and the second CT scan based image;

determine a mean atomic number for the at least one region;

determine the density of the portion of the DPF sample based on the mean atomic number; and determine at least one of a contamination level and a contaminant within the portion of the DPF sample by correlating the mean atomic number to a known contaminant.

12. The computer system of claim 10, the processing circuit further structured to identify the at least one region from the plurality of regions as a region of interest.

13. The computer system of claim 10, wherein the DPF sample is structured to maximize a resolution of the CT scan-based image and wherein the DPF sample is a quadrant of a substantially circular segment of the diesel particulate filter, the processing circuit further structured to:

determine at least one portion of the quadrant that is not essential to improving the resolution; and trim the at least one portion to reduce a size of the DPF sample.

14. A non-transitory computer-readable media comprising instructions stored thereon that, when executed by a processor of a computer system, cause the computer system to perform operations to determine a density of particulate matter in a diesel particulate filter (DPF) sample, the operations comprising:

generating a computed tomography (CT) scan-based image of the DPF sample;

segmenting the CT scan-based image of the DPF sample into a plurality of regions; and for at least one region from the plurality of regions,
  determining a density of a portion of the DPF sample corresponding to the at least one region of the CT scan-based image of the DPF sample by:
    determining a grayscale value for the at least one region of the plurality of regions in the particulate filter;
    determining a reference value for the at least one region based on a reference sample;
    comparing the grayscale value to the reference value, wherein the reference value is correlated to a certain density level; and
    determining the density based on the comparison to the reference value which indicates the density level; and
  causing an electronic display of a user device communicatively coupled to the computer system to display the CT scan-based image comprising the at least one region and an indication of the density for the at least one region.

15. The non-transitory computer-readable media of claim 14, wherein the CT scan based image of the DPF sample is a first CT scan based image generated at a first energy level, the operations further comprising:
  generate a second CT scan based image of the DPF sample at a second energy level different from the first energy level, the at least one region is common to the first CT scan based image and the second CT scan based image;
  determine a mean atomic number for the at least one region;
  determine the density of the portion of the DPF sample based on the mean atomic number; and
  determine at least one of a contamination level and a contaminant within the portion of the DPF sample by correlating the mean atomic number to a known contaminant.

16. The non-transitory computer-readable media of claim 14, wherein the DPF sample is structured to maximize a resolution of the CT scan-based image and wherein the DPF sample is a quadrant of a substantially circular segment of the diesel particulate filter, the operations further comprising:
  determine at least one portion of the quadrant that is not essential to improving the resolution; and
  trim the at least one portion to reduce a size of the DPF sample.

* * * * *